(12) United States Patent
Li

(10) Patent No.: US 10,976,809 B2
(45) Date of Patent: Apr. 13, 2021

(54) INTERACTION METHOD FOR VIRTUAL REALITY

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/456,558

(22) Filed: Mar. 12, 2017

(65) Prior Publication Data

US 2017/0262050 A1 Sep. 14, 2017

Related U.S. Application Data

(60) Provisional application No. 62/307,583, filed on Mar. 14, 2016.

(51) Int. Cl.
*G02B 27/01* (2006.01)
*G06F 3/0487* (2013.01)
(Continued)

(52) U.S. Cl.
CPC .............. *G06F 3/012* (2013.01); *A63F 13/21* (2014.09); *A63F 13/525* (2014.09); *G06F 3/011* (2013.01);
(Continued)

(58) Field of Classification Search
CPC ... G01S 19/14; G02B 27/0172; G02B 27/017; G06T 7/73; G06K 9/00718; G06F 3/012; G06F 1/3265; G01P 15/00
See application file for complete search history.

(56) References Cited

U.S. PATENT DOCUMENTS 8,947,323 B1 * 2/2015 Raffle ................... G09G 3/001
345/8
9,451,915 B1 * 9/2016 Wong ...................... G01P 15/00
(Continued)

FOREIGN PATENT DOCUMENTS

CN 102789313 A 11/2012
CN 104699247 A 6/2015
(Continued)

OTHER PUBLICATIONS

Corresponding Taiwanese office action dated Sep. 11, 2017.
(Continued)

*Primary Examiner* — Lin Li
(74) *Attorney, Agent, or Firm* — CKC & Partners Co., LLC

(57) ABSTRACT

A control method is utilized for switching virtual reality scenes in a virtual reality system. The virtual reality system includes a head-mount display device for displaying virtual reality visions. The control method includes operations of: providing a first virtual reality scene as the virtual reality visions to be displayed on the head-mount display device; obtaining a motion displacement of the head-mount display device; comparing the motion displacement with a threshold displacement; in response to the motion displacement being shorter than the threshold displacement, providing the first virtual reality scene in a first portion of the virtual reality visions and providing a second virtual reality scene in a second portion of the virtual reality visions according to the motion displacement; and, in response to the motion displacement exceeding the threshold displacement, providing the second virtual reality scene as the virtual reality visions to be displayed on the head-mount display device.

16 Claims, 10 Drawing Sheets

(51) Int. Cl.
  *G06F 1/16* (2006.01)
  *H04N 5/265* (2006.01)
  *G09G 3/00* (2006.01)
  *G06F 3/01* (2006.01)
  *G06F 3/0346* (2013.01)
  *H04N 21/442* (2011.01)
  *H04N 9/12* (2006.01)
  *G06T 7/20* (2017.01)
  *G06K 9/00* (2006.01)
  *G06T 7/70* (2017.01)
  *A63F 13/21* (2014.01)
  *A63F 13/525* (2014.01)

(52) U.S. Cl.
  CPC ............ *G06K 9/00671* (2013.01); *G06T 7/20* (2013.01); *G06T 7/70* (2017.01)

(56) References Cited

U.S. PATENT DOCUMENTS

| | | | | |
|---|---|---|---|---|
| 10,096,216 | B1* | 10/2018 | McClintock | G08B 29/188 |
| 2002/0024675 | A1* | 2/2002 | Foxlin | G06F 3/0346 |
| | | | | 356/620 |
| 2005/0041156 | A1* | 2/2005 | Kondo | H04N 9/12 |
| | | | | 348/700 |
| 2010/0085462 | A1* | 4/2010 | Sako | H04N 21/44218 |
| | | | | 348/333.01 |
| 2011/0090149 | A1 | 4/2011 | Larsen et al. | |
| 2012/0075168 | A1* | 3/2012 | Osterhout | G06F 3/011 |
| | | | | 345/8 |
| 2013/0139082 | A1* | 5/2013 | Wheeler | G06F 3/012 |
| | | | | 715/765 |
| 2014/0085203 | A1* | 3/2014 | Kobayashi | G01S 19/14 |
| | | | | 345/158 |
| 2014/0285403 | A1* | 9/2014 | Kobayashi | G02B 27/017 |
| | | | | 345/8 |
| 2015/0212647 | A1 | 7/2015 | Kim et al. | |
| 2015/0268473 | A1* | 9/2015 | Yajima | G02B 27/0172 |
| | | | | 345/633 |
| 2015/0331242 | A1* | 11/2015 | Cho | H04N 5/265 |
| | | | | 345/8 |
| 2015/0378159 | A1 | 12/2015 | Lundberg et al. | |
| 2016/0027213 | A1* | 1/2016 | Burns | G06F 3/012 |
| | | | | 345/633 |
| 2016/0062457 | A1* | 3/2016 | Kobayashi | G06F 1/163 |
| | | | | 345/156 |
| 2016/0291329 | A1* | 10/2016 | Kimura | G06F 3/0487 |
| 2016/0378861 | A1* | 12/2016 | Eledath | G06K 9/00718 |
| | | | | 707/766 |
| 2017/0227574 | A1* | 8/2017 | Theytaz | G01C 22/006 |
| 2018/0321493 | A1* | 11/2018 | Kim | G02B 27/0176 |

FOREIGN PATENT DOCUMENTS

| | | | | |
|---|---|---|---|---|
| TW | 201511803 A | | 4/2015 | |
| TW | 201608281 A | | 3/2016 | |
| WO | 2015099215 A1 | | 7/2015 | |
| WO | PCT/KR 2015/013413 | * | 9/2015 | ............ G06F 3/013 |
| WO | WO 2017151872 A1 | * | 11/2015 | ......... G02B 27/0176 |
| WO | PCT/KR 2015/013413 | * | 12/2015 | ............ G02B 27/01 |

OTHER PUBLICATIONS

Corresponding partial European search report dated Sep. 13, 2017.
Corresponding Chinese office action dated Jul. 9, 2019.

* cited by examiner

INTERACTION METHOD FOR VIRTUAL REALITY

RELATED APPLICATIONS

This application claims priority to U.S. Provisional Application Ser. No. 62/307,583, filed Mar. 14, 2016, which is herein incorporated by reference.

BACKGROUND

Field of Invention

The present application relates to a virtual reality system. More particularly, the present application relates to method for controlling an interaction between gesture or motion inputs from users and a virtual reality scene created by the virtual reality system.

Description of Related Art

In the current virtual reality (VR) environment, controller devices are commonly used to interact with VR scenes, such as game themes or VR contents. When a user wearing a head-mount display device, the visions of the user will be covered by the VR scene shown on the head-mount display device. The VR scene shows a scenario of a specific space. In some VR applications, the users are required to press some buttons on the controller for switching the VR scene, such as entering another room, transferring to another space, or launching from the ground into the air.

SUMMARY

The disclosure provides a virtual reality system, which includes a head-mount display device and a processing device. The head-mount display device is configured for displaying virtual reality visions. The processing device is communicated with the head-mounted display. The processing device is configured to provide a first virtual reality scene as the virtual reality visions to be displayed on the head-mount display device. The processing device is further configured to obtain a motion displacement of the head-mount display device. The processing device is further configured to compare the motion displacement with a threshold displacement. In response to the motion displacement is shorter than the threshold displacement, the processing device is further configured to provide the first virtual reality scene in a first portion of the virtual reality visions and provide a second virtual reality scene in a second portion of the virtual reality visions according to the motion displacement. In response to the motion displacement exceeds the threshold displacement, the processing device is further configured to provide the second virtual reality scene as the virtual reality visions to be displayed on the head-mount display device.

The disclosure provides a control method suitable for a virtual reality system. The virtual reality system includes a head-mount display device for displaying virtual reality visions. The control method includes operations of: providing a first virtual reality scene as the virtual reality visions to be displayed on the head-mount display device: obtaining a motion displacement of the head-mount display device; comparing the motion displacement with a threshold displacement; in response to the motion displacement being shorter than the threshold displacement, providing the first virtual reality scene in a first portion of the virtual reality visions and providing a second virtual reality scene in a second portion of the virtual reality visions according to the motion displacement; and, in response to the motion displacement exceeding the threshold displacement, providing the second virtual reality scene as the virtual reality visions to be displayed on the head-mount display device.

The disclosure provides a non-transitory computer readable storage medium with a computer program to execute aforesaid control method.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
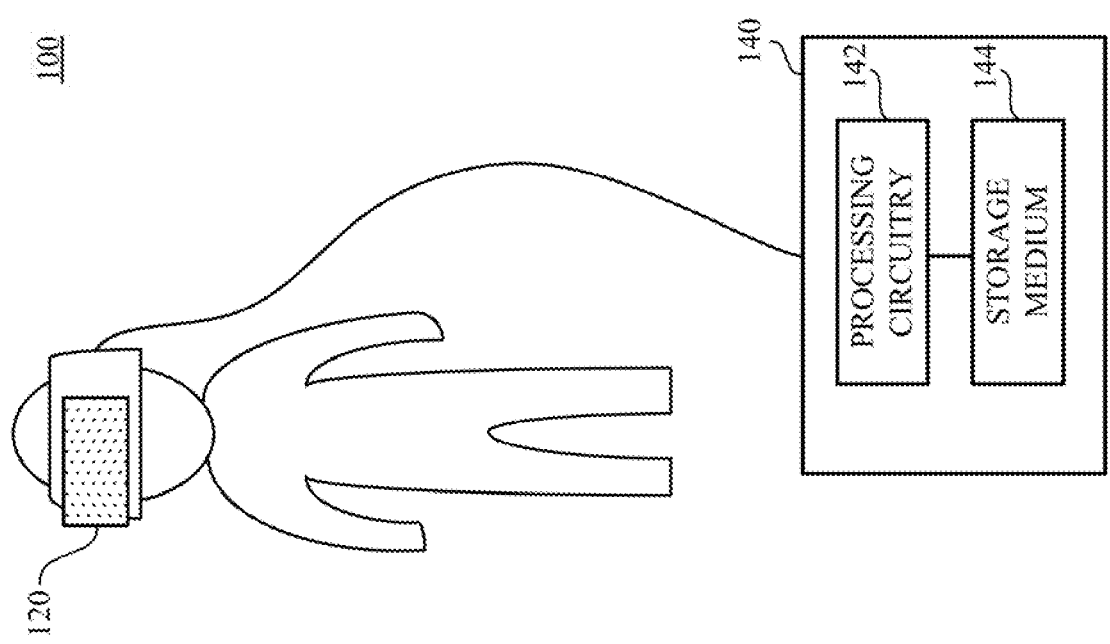
FIG. 1 is a schematic diagram illustrating a virtual reality system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a virtual reality (VR) system 100 according to an embodiment of this disclosure. As shown in FIG. 1, the virtual reality system 100 includes a head-mount display device (HMD) 120 and a processing device 140. The head-mount display device 120 can be disposed on a VR headset, which is wearable on a user. When a user wears the VR headset, the head-mount display device 120 will cover visions of the user, and the head-mount display device 120 is configured for providing virtual reality visions to the user.

The processing device 140 is coupled to the head-mount display device 120. The processing device 140 is a host device of the virtual reality system 100. In some embodiments, the processing device 140 can be implemented by a computer, a VR server, a smartphone, a gaming console or any device capable of controlling and driving the head-mount display device 120. As shown in FIG. 1, the processing device 140 is implemented as a stand-alone computer, but the disclosure is not limited thereto.

In another embodiment, the head-mount display device 120 and the processing device 140 can be integrated on the VR headset together. In this case, the processing device 140 is a processor or a control circuit implemented on the VR headset.

In still another embodiment, the head-mount display device 120 and the processing device 140 can be implemented by one smart phone. In this case, the smart phone includes a display panel as the head-mount display device 120 and a processor as the processing device 140.

The processing device 140 includes a processing circuitry 142 and a storage medium 144. The processing circuitry 142 can be a processor, a central processing unit, a control circuit and/or a graphic processing unit. The processing circuitry 142 is utilized to compute display data of the virtual reality visions to be displayed on the head-mount display device 120. The storage medium 144 can include a hard drive, a read-only memory and/or a flash memory. In the embodiment shown in FIG. 1, the head-mount display device 120 is coupled to the processing device 140 over a connection wiring, but the disclosure is not limited thereto. In another embodiment, the head-mount display device 120 can be wirelessly communicated with the processing device 140.

Figure 2:
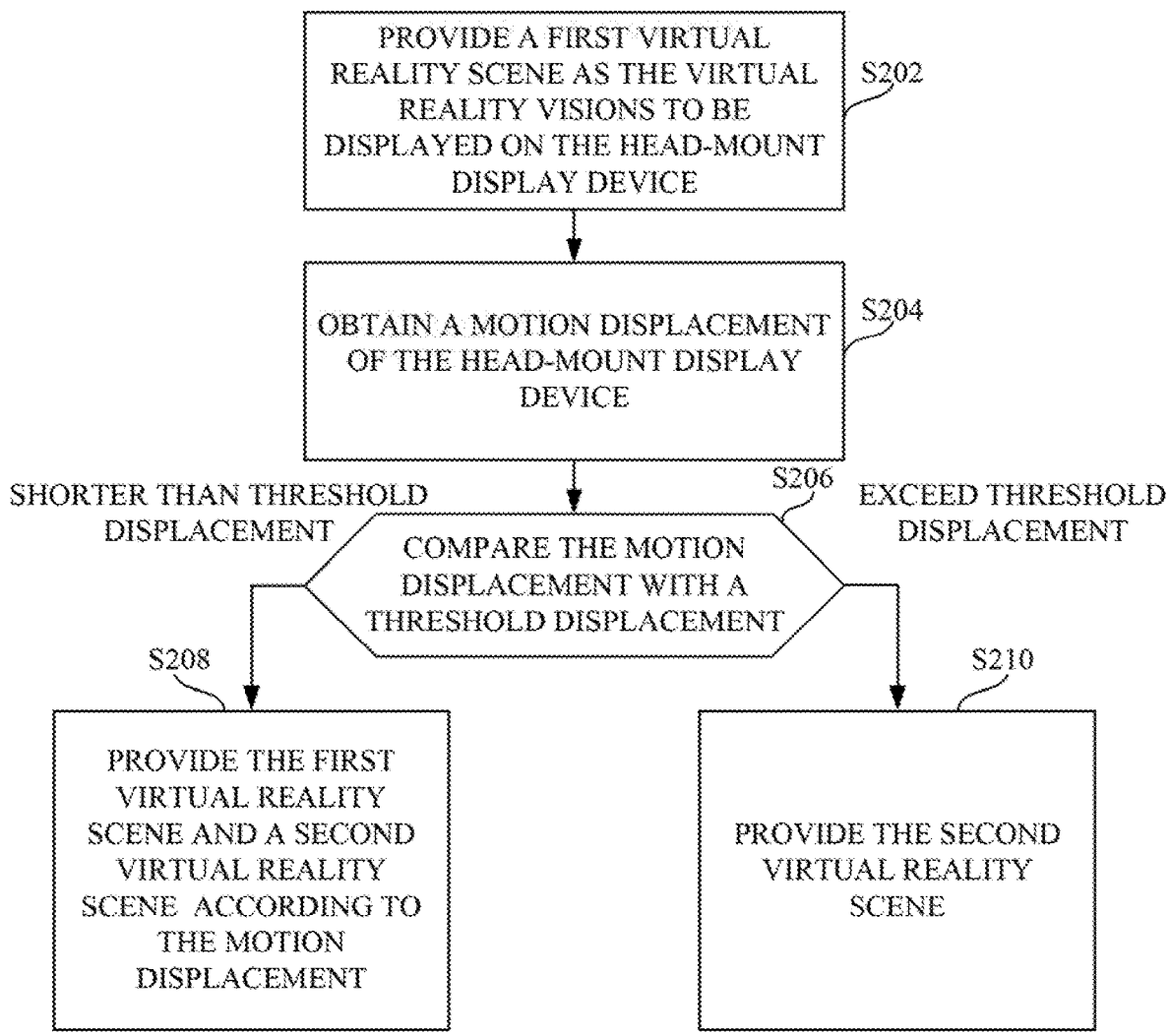
FIG. 2 is a flow chart diagram illustrating a control method according to an embodiment of the disclosure.

Reference is also made to FIG. 2, which is a flow chart diagram illustrating a control method 200 according to an embodiment of the disclosure. The control method 200 is suitable to be executed by the virtual reality system 100 in FIG. 1. The control method 200 includes operations S202-S210 for transferring or switching a scenario of the virtual reality visions experienced by the user according to a movement or a displacement of the head-mount display device 120 (or the user wearing the head-mount display device 120).

Reference is also made to FIG. 3A to FIG. 3D, which are schematic diagram illustrating the virtual reality visions 122 displayed by the head-mount display device 120 corresponding to different movements on the head-mount display device 120.

Figure 3B:
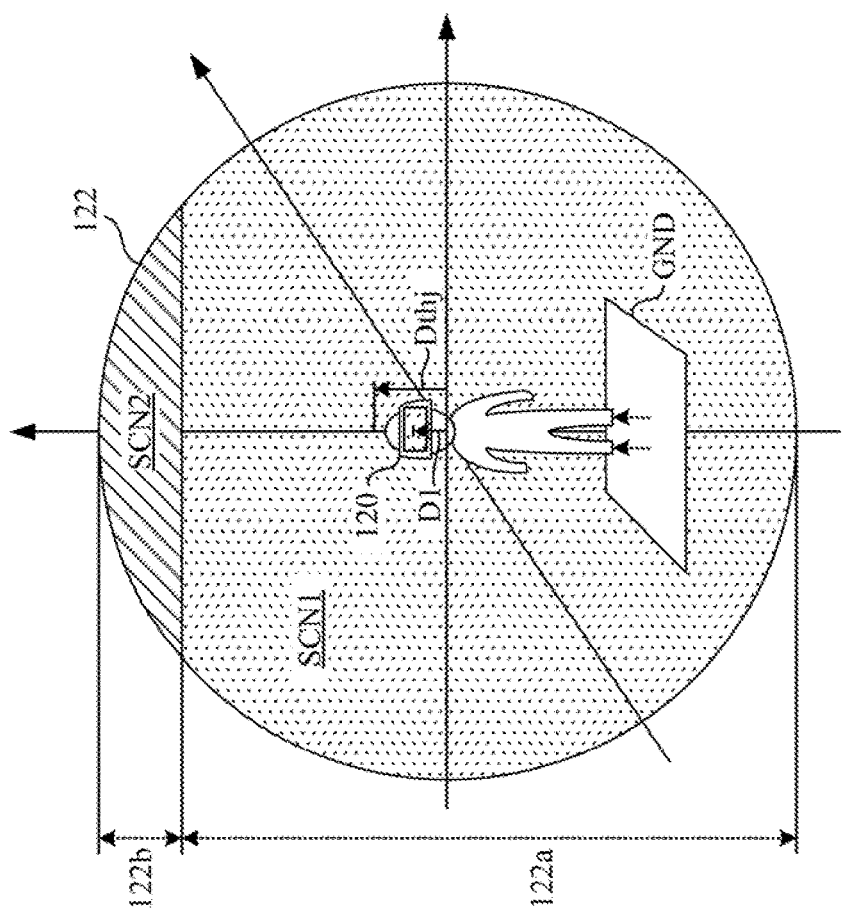
FIG. 3A to FIG. 3D are schematic diagram illustrating the virtual reality visions displayed by the head-mount display device corresponding to different movements on the head-mount display device.
Figure 3A:
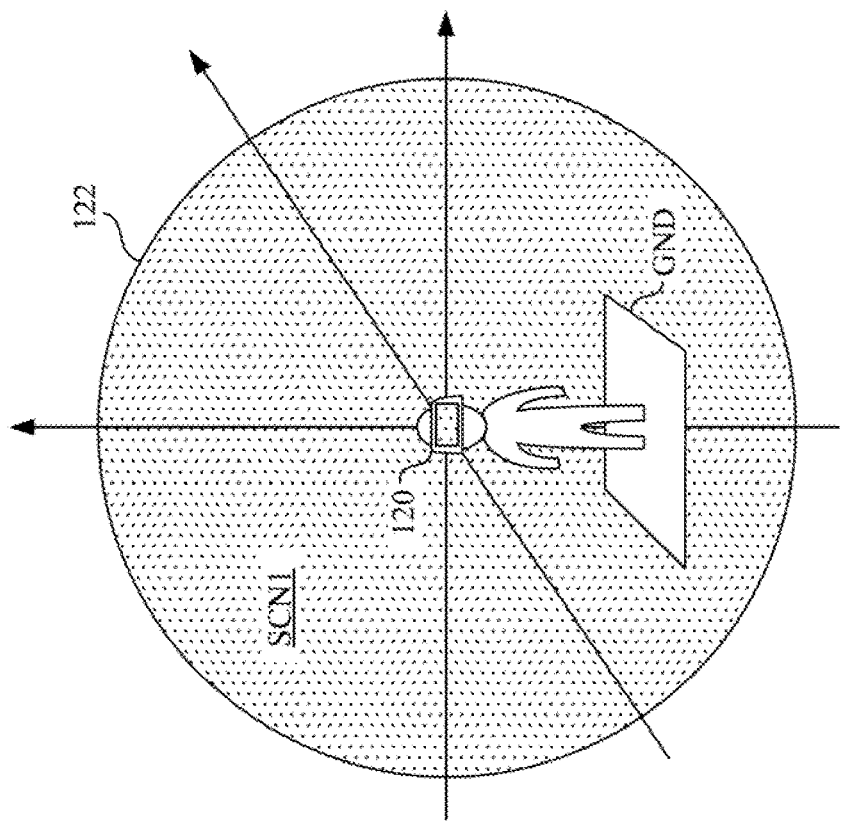

As shown in FIG. 1 and FIG. 3A, operation S202 of the control method 200 is executed by the processing device 140 to provide a first virtual reality scene SCN1 as the virtual reality visions 122 to be displayed on the head-mount display device 120. As shown in FIG. 3A, the user stands on a ground level GND without leaping up or squatting down toward the ground level GND. The first virtual reality scene SCN1 is what the user sees initially through the head-mount display device 120. The first virtual reality scene a building, etc. For example, if the user perform a vertical movement upward (e.g., jumping up), the virtual reality visions 122 will vary (e.g., from the landscape view at the ground level into a top view from a high altitude, or from the view on the $2^{nd}$ floor in the building) according to the vertical movement upward. Details about interactions between the virtual reality visions 122 about the movement are explained in following paragraphs.

As shown in FIG. 1 and FIG. 3B operation S204 of the control method 200 is executed by the processing device 140 to obtain a motion displacement of the head-mount display device 120. In the embodiment shown in FIG. 3B, the user jumps, such that the head-mount display device 120 moves upward from an original level (referring to FIG. 3A) with a motion displacement D1.

The motion displacement D1 of the head-mount display device 120 can be detected, by various ways. In an embodiment, the virtual reality system 100 includes a base station (not shown in figures). The base station is located at a reference point and configured for emitting an optical radiation. The head-mount display device 120 may further include an optical sensor array (not shown in figures). The optical sensor array, which includes multiple optical sensors, is able to detect the optical radiation sent from the base station. Each of the optical sensors is disposed on different positions on the head-mount display device 120, and each of the optical sensors will receive the optical radiation with slightly difference timings (and radiation strengths). Based on the differences of the timings (or the radiation strengths) and known distances between the optical sensors, a distance and an angle between the reference point and the head-mount display device 120 can be detected. Accordingly, a motion displacement of the head-mount display device 120 can be obtained.

In another embodiment, the virtual reality system 100 may include a depth camera (not shown in figures) for capturing continuous images. The continuous images may include objects located at different depths. The depth camera is configured to track variance of the depths of the head-mount display device 120, and so as to calculate the motion displacement D1 of the head-mount display device 120.

In still another embodiment, the head-mount display device 120 includes a motion sensor (e.g., a gravity sensor, an accelerometer sensor or an Inertial Measurement Unit sensor). The motion sensor is configured to sense movement or acceleration on the head-mount display device 120, so as to calculate the notion displacement D1 of the head-mount display device 120.

In still another embodiment, the head-mount display device 120 includes a camera sensor. The camera sensor is configured to capture continuous images relative to a reference point in the surrounding environment. Based on the relative movement of the reference point in the continuous images captured by the camera sensor, the motion displacement D1 of the head-mount display device 120 can be obtained.

Aforesaid embodiments are listed for demonstrating possible ways to obtain the motion displacement D1 of the head-mount display device 120 but this disclosure is not limited thereto.

As shown in FIG. 1 and FIG. 3B, operation S206 of the control method 200 is executed by the processing device 140 to compare the motion displacement D1 with a threshold displacement Dthj. As shown in FIG. 3B, the motion displacement D1 of the head-mount display device 120 is an upward vertical displacement and the motion displacement D1 is shorter than the threshold displacement Dthj.

The threshold displacement Dthj is a threshold height assigned by the virtual reality system 100. In an embodiment, the threshold displacement Dthj can be a fixed value (e.g., 30 cm). When the user jumps high enough (over 30 cm) and the motion displacement of the head-mount display device 120 exceeds the threshold displacement Dthj, the virtual reality visions 122 will be changed into a different scenario other than the first virtual reality scene SCN1.

In the embodiment shown in FIG. 3B the motion displacement D1 is shorter than the threshold displacement Dthj.

When the motion displacement D1 is shorter than the threshold displacement Dthj, the operation S208 of the control method 200 is executed by the processing device 140 to provide the first virtual reality scene SCN1 in a first portion 122a of the virtual reality visions 122 and provide a second virtual reality scene SCN2 in a second portion 122b of the virtual reality visions 122 according to the motion displacement D1.

Under the condition that the motion displacement D1 is an upward vertical displacement and the motion displacement D1 is shorter than the threshold displacement Dthj as shown in the embodiment shown in FIG. 38, the first portion 122a is located at a lower part of the virtual reality visions 122 and the second portion 122b is located at a higher part of the virtual reality visions 122. In other words, the higher part of the virtual reality visions 122 will be replaced into the second virtual reality scene SCN2. When the user does not jump high enough to transfer the whole scene of the virtual reality visions 122, the user can have a preview about how it looks in the second virtual reality scene SCN2.

In an embodiment, the ratio between the first portion 122a and the second portion 122b in the virtual reality visions 122 is not a fixed ratio. The ratio will vary according to the motion displacement. If the user jumps higher, a larger portion of the virtual reality visions 122 will be replaced into the second virtual reality scene SCN2. The motion displacement will affect a ratio between the first portion 122a (the first virtual reality scene SCN1) and the second portion 122b (the second virtual reality scene SCN2) in the virtual reality visions 122.

Figure 3D:
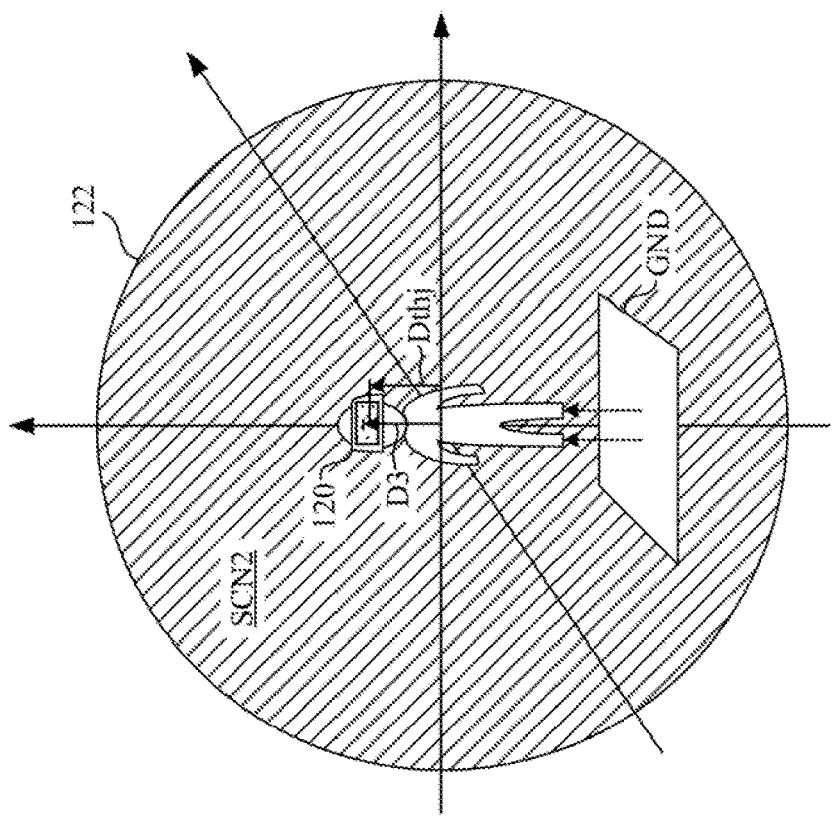
Figure 3C:
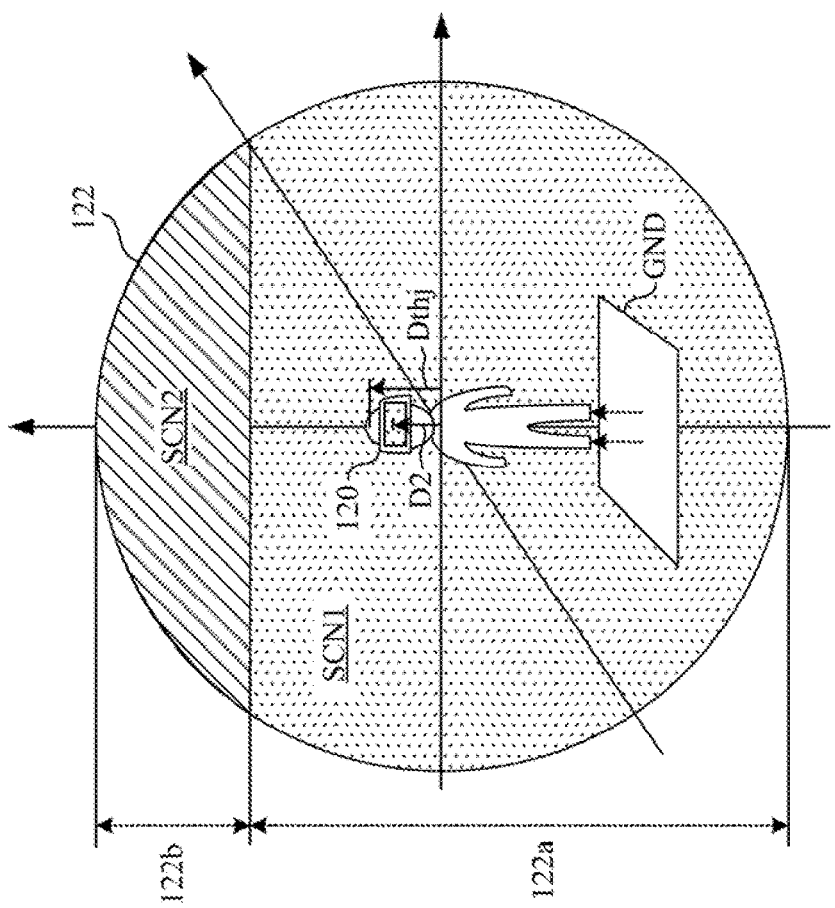

In the embodiment shown in FIG. 3C, the motion displacement D2 is longer than the motion displacement D1 shown in FIG. 3B, and the motion displacement D2 is still shorter than the threshold displacement Dthj. The threshold height assigned by the virtual reality system 100.

When the motion displacement D2 is shorter than the threshold displacement Dthj, the operation S208 of the control method 200 is executed by the processing device 140 to provide the first virtual reality scene SCN1 in the first portion 122a of the virtual reality visions 122 and provide the second virtual reality scene SCN2 in the second portion 122b of the virtual reality visions 122 according to the motion displacement D2. A ratio of the second portion 122b relative to the whole virtual reality visions 122 is positively correlated to the motion displacement D2. When the user jumps higher and the motion displacement D2 of the head-mount display device 120 is longer, the ratio of the second portion 122b relative to the whole virtual reality visions 122 will increase accordingly, such that the virtual reality visions 122 will reveal more about the second virtual reality scene SCN2.

As shown in FIG. 3D which indicates the user jumps higher to achieve another motion displacement D3 of the head-mount display device 120. In this case, the motion displacement D3 of the head-mount display device 120 exceeds the threshold displacement Dthj. As shown in FIG. 2 and FIG. 3D, when the motion displacement D3 exceeds the threshold displacement Dthj, operation S210 of the control method 200 is executed by the processing device 140 to provide the second virtual reality scene SCN2 as the virtual reality visions 122 to be displayed on the head-mount display device 120.

The first virtual reality scene SCN1 and the second virtual reality scene SCN2 correspond to different scenarios (e.g., locating at different positions, locating at different cities, locating at different planets, displaying with different color tones, switching between ancient time and modern time) created by the virtual reality system 100. Therefore, the user can experience the transferring from the first virtual reality scene SCN1 to the second virtual reality scene SCN2 (from a ground scene to a fly scene, or from $2^{nd}$ floor scene to $3^{rd}$ floor scene, for example).

Figure 4B:
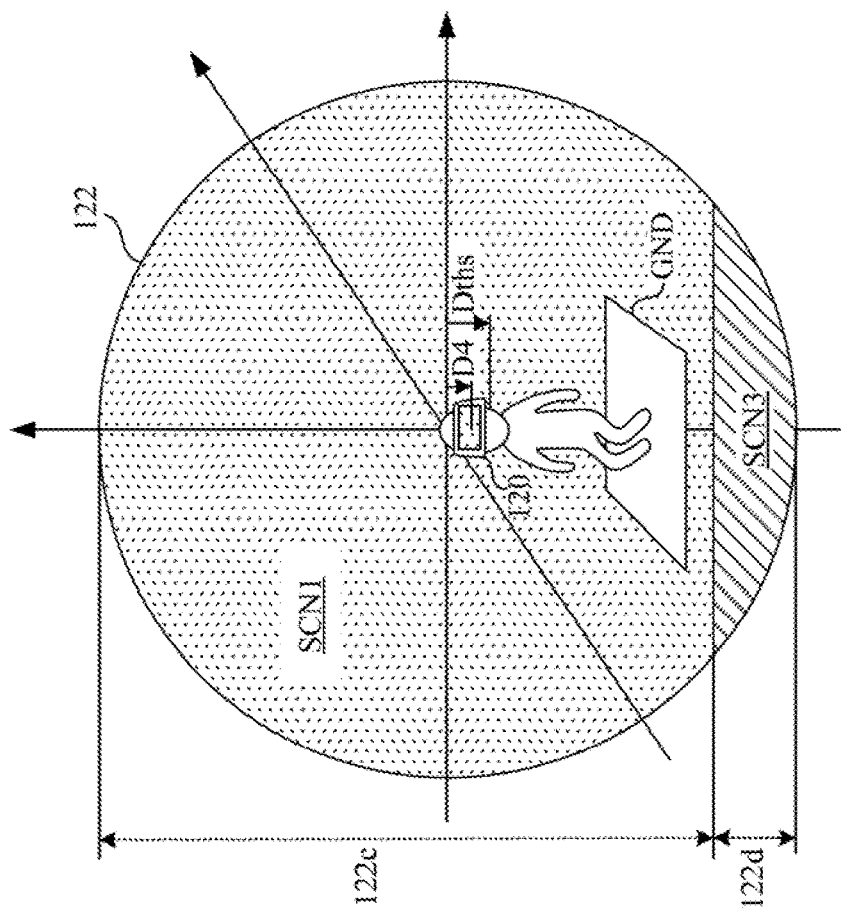
FIG. 4A to FIG. 4C are schematic diagram illustrating the virtual reality visions displayed by the head-mount display device corresponding to downward vertical displacements on the head-mount display device.
Figure 4A:
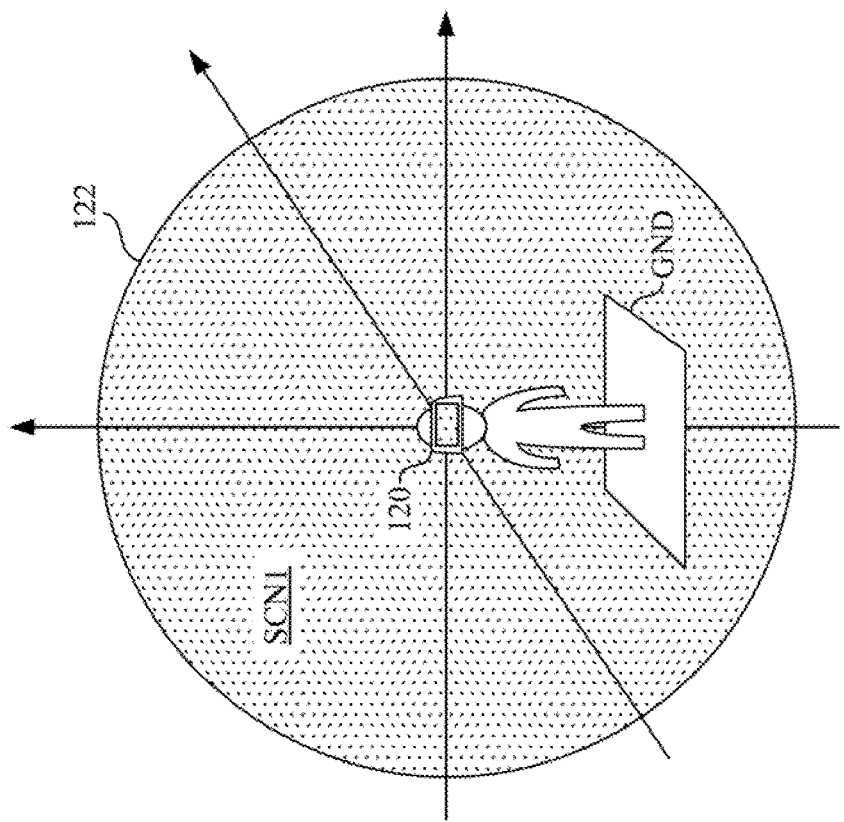
Figure 4C:
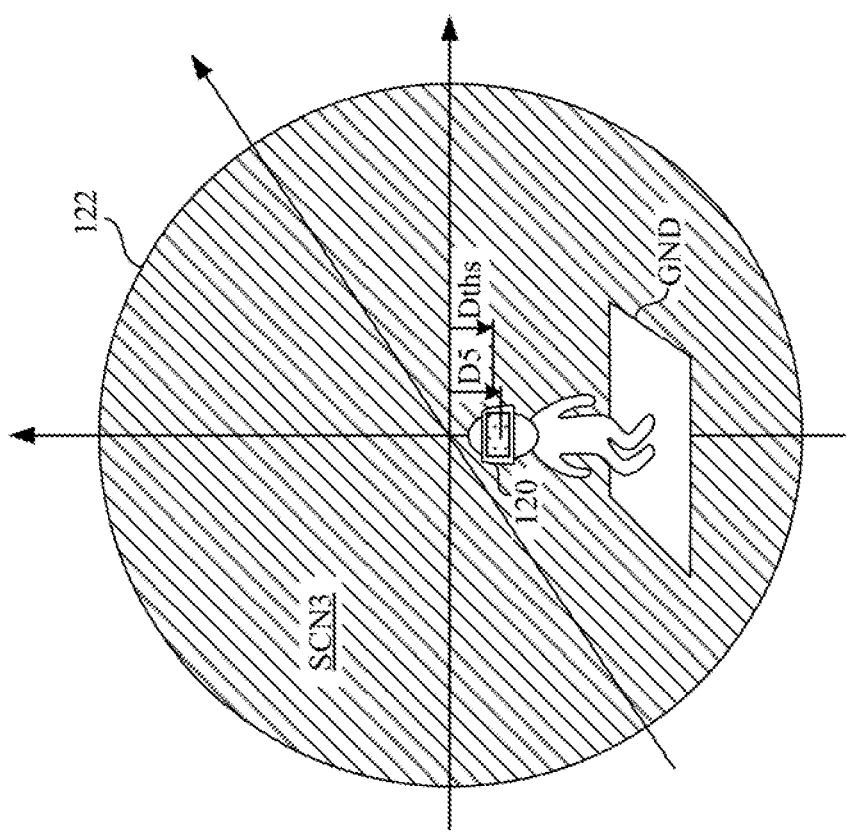

In aforesaid embodiments, the motion displacements of the head-mount display device 120 are upward vertical displacements for demonstration, but this disclosure is not limited to upward vertical displacements. Reference is also made to FIG. 4A to FIG. 4C, which are schematic diagram illustrating the virtual reality visions 122 displayed by the head-mount display device 120 corresponding to downward vertical displacements on the head-mount display device 120.

As shown in FIG. 1 and FIG. 4A, operation S202 of the control method 200 is executed by the processing device 140 to provide the first virtual reality scene SCN1 as the virtual reality visions 122 to be displayed on the head-mount display device 120. As shown in FIG. 4A, the user stands on a ground level GND without leaping up or squatting down toward the ground level GND. The first virtual reality scene SCN1 is what the user sees initially through the head-mount display device 120. The first virtual reality scene SCN1 may include a landscape view on a ground level, a view on the $1^{st}$ floor in a building, etc. For example, if the user perform a vertical movement downward (e.g., squatting toward the ground), the virtual reality visions 122 vary (e.g., from the landscape view at the ground level into an underground view or an underwater view) according to the vertical movement downward. Details about interactions between the virtual reality visions 122 about the movement in FIG. 4A to FIG. 4C are explained in following paragraphs.

In the embodiment shown in FIG. 4B, the user squats downward to the ground, such that the head-mount display device 120 moves downward from an original level (referring to FIG. 4A) with the motion displacement D4. Operation S204 of the control method 200 in FIG. 2 is executed by the processing device 140 to obtain the motion displacement D4 of the head-mount display device 120.

As shown in FIG. 2 and FIG. 4B, operation S206 of the control method 200 is executed by the processing device 140 to compare the motion displacement D4 with a threshold displacement Dths. In an embodiment, the threshold displacement Dths can be a fixed value. In an embodiment, the threshold displacement Dths (e.g., 20 cm) for the downward threshold can be different from the threshold displacement Dthj for the upward threshold (also referring to FIG. 3B to FIG. 3D). In another embodiment, the threshold displacement Dths (e.g., 30 cm) for downward threshold can be the same as the threshold displacement Dthj for the upward threshold. When the user squats low enough and the motion displacement D4 of the head-mount display device 120 exceeds the threshold displacement Dths, the virtual reality visions 122 will be changed into a different scenario other than the first virtual reality scene SCN1.

As shown in FIG. 4B, when the motion displacement D4 is shorter than the threshold displacement Dths, the operation S208 of the control method 200 is executed by the processing device 140 to provide the first virtual reality scene SCN1 in a first portion 122c of the virtual reality visions 122 and provide a second virtual reality scene SCN3 in a second portion 122d of the virtual reality visions 122 according to the motion displacement D1.

Under the condition that the motion displacement D4 is a downward vertical displacement and the motion displacement D4 is shorter than the threshold displacement Dths as shown in the embodiment shown in FIG. 4B, the first portion 122c is located at a higher part of the virtual reality visions 122 and the second portion 122d is located at a lower part of the virtual reality visions 122. In other words, the lower part of the virtual reality visions 122 will be replaced into the second virtual reality scene SCN3. When the user does not squat low enough to transfer the whole scene of the virtual reality visions 122, the user can have a preview about how it looks in the second virtual reality scene SCN3.

In an embodiment, the ratio between the first portion 122c and the second portion 122d in the virtual reality visions 122 is not a fixed ratio. The ratio will vary according to the motion displacement D4. If the user squats lower, a larger portion of the virtual reality visions 122 will be replaced into the second virtual reality scene SCN3 The motion displacement D4 will affect a ratio between the first portion 122c (the first virtual reality scene SCN1) and the second portion 122d (the second virtual reality scene SCN3) in the virtual reality visions 122.

As shown in FIG. 4C, which indicates the user squats lower to achieve another motion displacement D5 of the head-mount display device 120. In this case, the motion displacement D5 of the head-mount display device 120 exceeds the threshold displacement Dths. As shown in FIG. 2 and FIG. 4C, when the motion displacement D5 exceeds the threshold displacement Dths, operation S210 of the control method 200 is executed by the processing device 140 to provide the second virtual reality scene SCN3 as the virtual reality visions 122 to be displayed on the head-mount display device 120.

The first virtual reality scene SCN1 and the second virtual reality scene SCN3 correspond to different scenarios created by the virtual reality system 100. Therefore, the user can experience the transferring from the first virtual reality scene SCN1 to the second virtual reality scene SCN3 (from a ground scene to an underground scene or to an underwater scene, for example).

Figure 5:
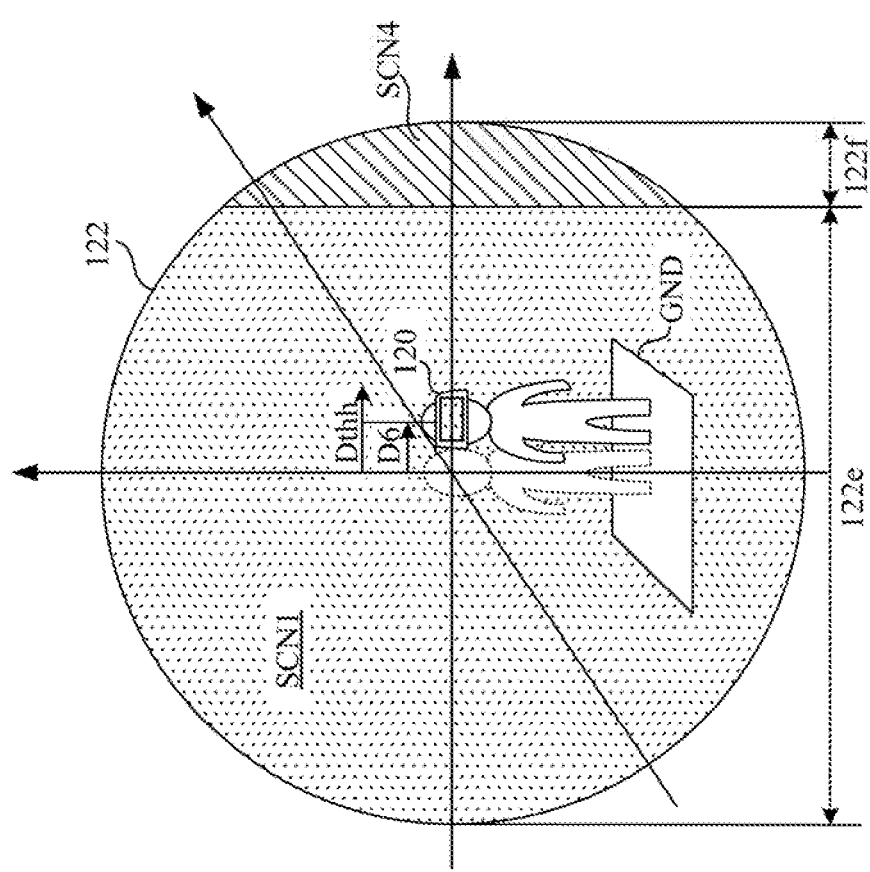
FIG. 5 is a schematic diagram illustrating the virtual reality visions displayed by the head-mount display device corresponding to a horizontal displacement on the head-mount display device.

Furthermore, the motion displacements D1-D5 in aforesaid embodiments are vertical motion displacements for demonstration but the disclosure is not limited thereto. In some other embodiments, the motion displacement can also be a horizontal displacement (e.g., the user dash horizontally) along a moving direction. Reference is further made to FIG. 5, which is a schematic diagram illustrating the virtual reality visions 122 displayed by the head-mount display device 120 corresponding to a horizontal displacement D6 on the head-mount display device 120. The user in the embodiment shown in FIG. 5 dash in a horizontal rightward direction. When the horizontal displacement D6 is shorter than a threshold displacement Dthh, the virtual reality visions 122 will include a first portion 122e displaying the first virtual reality scene SCN1 and a second portion 122f displaying the second virtual reality scene SCN4. The second portion 122f is located at a front end of the virtual reality visions 122 along the moving direction (e.g., rightward in this embodiment) of the horizontal displacement D6, and the first portion 122e is located at a rear end of the virtual reality visions 122. When the horizontal displacement exceed than the threshold displacement Dthh, the whole the virtual reality visions 122 will be switched into the second virtual reality scene SCN4. Further details about switching scenes along the horizontal displacement are similar, and can be referred, to aforesaid embodiments related to the vertical displacements, and not to be repeated herein.

Figure 6:
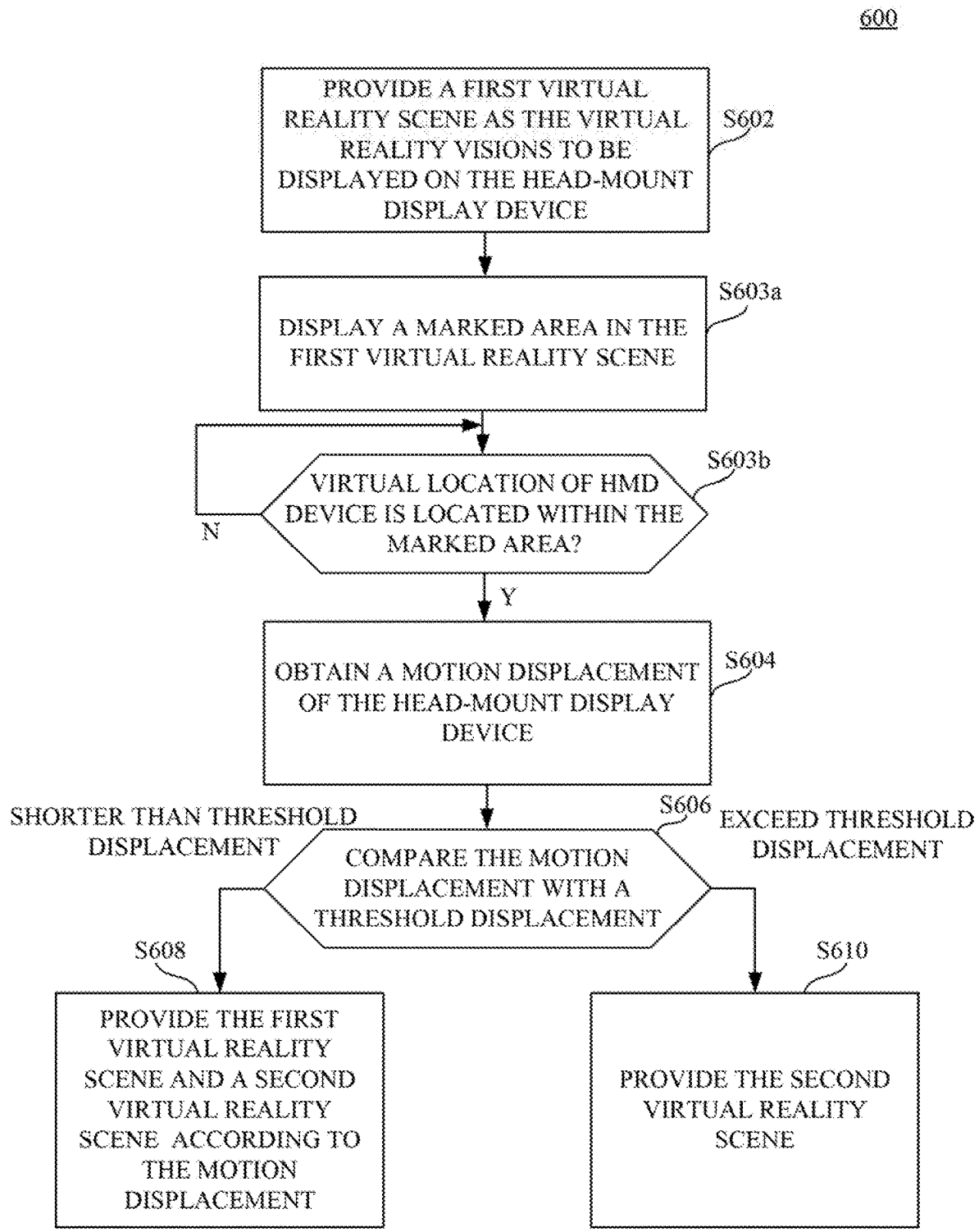
FIG. 6 is a flow chart diagram illustrating a control method according to another embodiment of the disclosure.

Reference is also made to FIG. 6, which is a flow chart diagram illustrating a control method 500 according to another embodiment of the disclosure. The control method 600 is suitable for the virtual reality system 100 shown in FIG. 1, Operations S602, S604, S606, S608 and S610 of the control method 600 are similar to operation S202, S204, S206, S208 and S210 of the control method 200 in FIG. 2 and aforesaid embodiments, and, not to be repeated here again.

Figure 7:
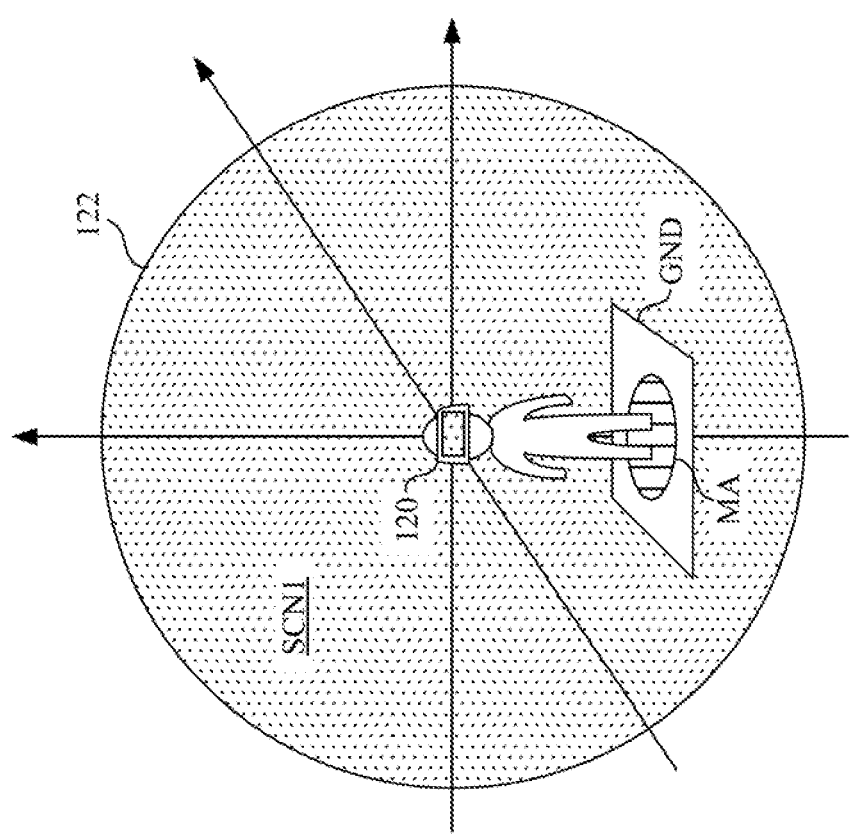
FIG. 7 is a schematic diagram illustrating a marked are in the first virtual reality scene according to an embodiment.

As shown in FIG. 6, the control method 606 further includes operations S603a and S603b before obtaining the motion displacement (S604). As shown in FIG. 1 and FIG. 6, operation S603a is executed by the processing device 140 to display a marked area in the first virtual reality scene. Reference is also made to FIG. 7, which is a schematic diagram illustrating the marked area MA in the first virtual reality scene SCN1 according to an embodiment. The marked area MA can be a circle, a token or a portal on the ground GND or a box-shaped region for accommodating the user in the first virtual reality scene SCN1, In an embodiment, the scenario switching will be triggered only when a virtual location of the head-mount display device 120 (or the virtual location of the user) is located within the marked area MA. Operation S603b is executed by the processing device 140 to detect whether a virtual location of the head-mount display device 120 in the first virtual reality scene is located within the marked area MA or not. As shown in FIG. 7 the user wearing the head-mount display device 120 steps in the marked area MA. When the user jumps, squats or dash from the marked area MA, operation S604 will be triggered to obtain the motion displacement, so as to perform following operations S606-S610. On the other hand, when the virtual location of the head-mount display device 120 is located outside the marked area MA, the motion displacement will be ignored, or the virtual reality system 100 will deactivate the detection of the motion displacement and the motion displacement will be void in this case.

Based on this embodiment shown in FIG. 6 and FIG. 7, the scenario, switching will only be triggered when the user steps into the marked area MA. Therefore, the virtual reality system 100 will not be confused about whether the user is trying to do a normal movement or trying to switch the virtual reality scene.

In aforesaid embodiments shown in FIG. 2, FIG. 3A to FIG. 3D and FIG. 4A to FIG. 4C the threshold displacement Dthj or the threshold displacement Dths is a fixed value for demonstration. However; the disclosure is not limited thereto. In another embodiment, the threshold displacement Dthj or Dths is an adjustable value according to at least one parameter corresponding to a user wearing the head-mount display device, and the at least one parameter comprises a height, a weight, an age or a gender.

Figure 8:
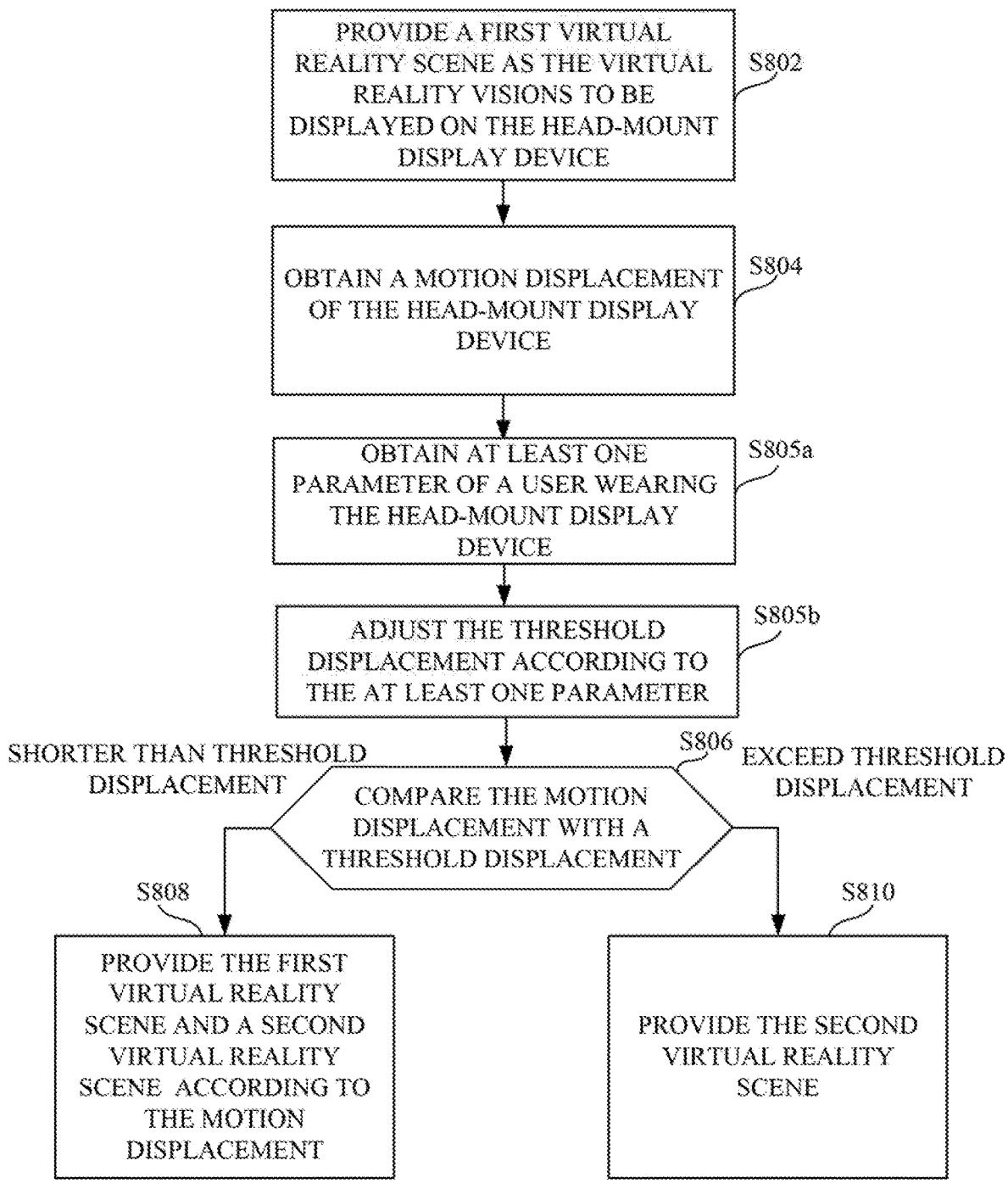
FIG. 8 is a flow chart diagram illustrating a control method according to an embodiment of the disclosure.

Reference is also made to FIG. 8, which is a flow chart diagram illustrating a control method 800 according to an embodiment of the disclosure. The control method 800 is suitable for the virtual reality system 100 in FIG. 1. Operations S802 S804, S806, S808 and S810 of the control method 800 are similar to operation S802, S204, S206, S208 and S210 of the control method 200 in FIG. 2 and aforesaid embodiments, and not to be repeated here again. As shown in FIG. 8, the control method 800 further includes operations S805a and S805b before comparing the motion displacement with the threshold displacement (S806).

As shown in FIG. 1 and FIG. 8, operation S805a is executed by the processing device 140 to obtain at least one parameter of a user wearing the head-mount display device 120. The at least one parameter includes a height, a weight, an age or a gender of the user. In an example, the virtual reality system 100 can include an input device (e.g., a keyboard, a gamepad, a touch screen) for the user to enter his/her personal information about the height, the weight, the age and/or the gender. In another example, the virtual reality system 100 can include a telecommunication transceiver which is able to download a personal profile about the user when the user logs in with his/her personal account, and the personal profile can include aforesaid parameters of the user. In still another example, the virtual reality system 100 can include a camera device (not shown in figures) which can capture an image about the user, and the processing device can analyze aforesaid parameters of the user according the image captured by the camera device. Based on at least one of aforesaid manners, the at least one parameter about the user can be obtained by the processing device 140.

Operation S805*b* is executed by the processing device 140 to adjust the threshold displacement according to the at least one parameter. Take the threshold displacement Dthj shown in FIG. 3B to FIG. 3D for demonstration.

In an embodiment, the threshold displacement Dthj can be calculated by a formula as follow:

$$Dthj=j\%*(\text{Height of User})$$

In this example, j % is a fixed percentage about the relationship between the height of user and the threshold displacement Dthj. It is assumed that j % is 20%, the threshold displacement. Dthj will be assigned as 34 cm for a user who is 170 cm tall; the threshold displacement Dthj will be assigned as 32 cm for a user who is 160 cm tall.

In another embodiment, the threshold displacement Dthj can be calculated by a formula as follow:

$$Dthj=hj*j\%*(\text{Height of User})$$

In this example, j % a fixed percentage about the relationship between the height of user and the threshold displacement Dthj, and hj is a compensation index from 0 to 1 and the compensation index hj will be different corresponding to different heights of user. It is assumed that j % is 20% and the compensation index hj is 0.7 for a user who is 170 cm tall, the threshold displacement Dthj will be assigned as 23.8 cm (0.7*20%*170). In another case, it is assumed that j % is 20% and the compensation index hj is 0.6 for a user who is 160 cm tall, the threshold displacement Dthj will be assigned as 19.2 cm (0.6*20%*160). The compensation index hj for different heights of users can be recorded in a lookup table in the storage medium 144 in FIG. 1.

In another embodiment, the threshold displacement Dthj can be calculated by a formula as follow:

$$Dthj=wj*j\%*(\text{Height of User})$$

In this example, j % is a fixed percentage about the relationship between the height of user and the threshold displacement Dthj, and wj is a compensation index from 0 to 1 and the compensation index wj be different corresponding to different weights of user. It is assumed that j % is 20% and the compensation index wj is 0.9 for a user who is weighted 70 kg, the threshold displacement Dthj will be assigned as 30.6 cm (0.9*20%*170). In another case, it is assumed that j % is 20% and the compensation index wj is 0.6 for a user who is weighted 90 kg, the threshold displacement Dthj will be assigned as 19.2 cm (0.6*20%*160). The compensation index wj for different weights of users can be recorded in a lookup table in the storage medium 144 in FIG. 1.

In still another embodiment, the threshold displacement Dthj can be calculated by a formula as follow:

$$Dthj=aj*j\%*(\text{Height of User})$$

In this example, j % is a fixed percentage about the relationship between the height of user and the threshold displacement Dthj, and aj is a compensation index from 0 to 1 and the compensation index aj will be different corresponding to different ages of users. It is assumed that j % is 20%, the compensation index aj is 0.8 for a user is 20 years old and the user is 170 cm tall, the threshold displacement Dthj will be assigned as 27.2 cm (0.8*20%*170). In another case, it is assumed that j % is 20%, the compensation index aj is 0.4 for a user is 60 years old and the user is 170 cm tall, the threshold displacement Dthj will be assigned as 13.6 cm (0.4*20%*170). The compensation index aj for different ages of users can be recorded in a lookup table in the storage medium 144 in FIG. 1.

In still another embodiment, the threshold displacement Dthj can be calculated by a formula as follow:

$$Dthj=gj*j\%*(\text{Height of User})$$

In this example, j % is a fixed percentage about the relationship between the height of user and the threshold displacement Dthj, and gj is a compensation index from 0 to 1 and the compensation index gj will be different corresponding to different genders of users. It is assumed that j % is 20%, the compensation index gj is 0.8 for a user is female and the user is 170 cm tall the threshold displacement Dthj will be assigned as 27.2 cm (0.8*20%*170). In another case, it is assumed that j % is 20%, the compensation index gj is 1 for a user is male and the user is 170 cm tall, the threshold displacement Dthj will be assigned as 34 cm (1*20%*170). The compensation index gj for different genders of users can be recorded in a lookup table in the storage medium 144 in FIG. 1.

In still another embodiment, the threshold displacement Dthj can be calculated by a formula as follow:

$$Dthj=hj*wj*aj*gj*j\%*(\text{Height of User})$$

In this example, the threshold displacement Dthj is adjusted according to the combination of the height, the weight, the age and the gender of the user.

In other words, the threshold displacement Dthj is adjusted by the processing device 140 according to a combination including at least one of height, weight, age and/or gender of the user.

Based on the control method 800 shown in FIG. 8, the threshold displacement can be optimized for different users. Therefore, each user with different characteristics will have different thresholds for switching the virtual reality screen. In this case, the user with a heavy weight will not have to jump over a high standard to switch the virtual reality screen. On the other hand, the threshold will not be oversensitive for the user who can really jump high into the air.

In addition, the threshold displacement Dths of the embodiment FIG. 4B to FIG. 4C can be calculated and adjusted in a similar way. The threshold displacement Dths can also be adjusted according to a combination including at least one of height, weight, age and/or gender of the user.

In addition, the threshold displacement Dthh of the embodiments in FIG. 5 can be calculated and adjusted in a similar way. The threshold displacement Dthh can also be adjusted according to a combination including at least one of height, eight, age and/or gender of the user.

Although the present invention has been described in considerable detail with reference to certain embodiments thereof, other embodiments are possible Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A virtual reality system, comprising:
   a head-mount display device, configured for displaying virtual reality visions;

a virtual reality headset which is wearable on a user, wherein the head-mount display device is disposed on the virtual reality headset, and when the virtual reality headset is worn on a user, the head-mount display device covers the eyes of the user;

a processing device, communicated with the head-mounted display, the processing device being configured to:

provide a first virtual reality scene as a whole of the virtual reality visions to be displayed on the head-mount display device;

obtain a motion displacement of the head-mount display device;

compare the motion displacement with a threshold displacement;

in response to the motion displacement being shorter than the threshold displacement, provide the first virtual reality scene in a first portion of the virtual reality visions and provide a second virtual reality scene in a second portion of the virtual reality visions according to the motion displacement;

in response to the motion displacement exceeding the threshold displacement, provide the second virtual reality scene as the virtual reality visions to be displayed on the head-mount display device, wherein the threshold displacement is an adjustable value according to at least one parameter corresponding to a user wearing the head-mount display device, and the at least one parameter comprises a height, a weight, an age or a gender, wherein the first virtual reality scene corresponds to a first scenario and the second virtual reality scene corresponds to a second scenario different from the first scenario, wherein the motion displacement comprises an upward vertical displacement and a downward vertical displacement, and simultaneously an unvarying leftward or rightward rotational displacement, and further simultaneously an unvarying upward or downward tilting displacement, and wherein a change, from providing the first virtual reality scene as the whole of the virtual reality visions into providing the second virtual reality scene in the second portion of the virtual reality visions or as the whole of the virtual reality visions, takes place when a gaze direction of the user while wearing the virtual reality headset is maintained toward a front direction of the user, and the front direction is unvarying in the rotational direction;

wherein before obtaining the motion displacement, the processing device being further configured to:

display a marked area in the first virtual reality scene; and detect whether a virtual location of the head-mount display device in the first virtual reality scene is located within the marked area or not;

wherein in response to the virtual location being located within the marked area, obtaining the motion displacement of the head-mount display device, and wherein in response to the virtual location being located outside the marked area, ignoring or voiding the motion displacement of the head-mount display device;

wherein the threshold displacement is used for comparison with the motion displacement, comprises a vertical distance, and is free of relation to a leftward or rightward rotational distance and an upward or downward tilting distance.

2. The virtual reality system of claim 1, wherein in response to that the motion displacement is shorter than the threshold displacement, a ratio of the second portion of the virtual reality visions relative to the whole virtual reality visions is positively correlated to the motion displacement.

3. The virtual reality system of claim 1, wherein in response to that the motion displacement is the upward vertical displacement and the motion displacement is shorter than the threshold displacement, the first portion of the virtual reality visions is located at a lower part of the virtual reality visions, the second portion of the virtual reality visions is located at a higher part of the virtual reality visions.

4. The virtual reality system of claim 1, wherein in response to that the motion displacement is the downward vertical displacement and the motion displacement is shorter than the threshold displacement, the first portion of the virtual reality visions is located at a higher part of the virtual reality visions, the second portion of the virtual reality visions is located at a lower part of the virtual reality visions.

5. The virtual reality system of claim 1, wherein the motion displacement further comprises a horizontal displacement, in response to that the motion displacement is the horizontal displacement along a moving direction and the motion displacement is shorter than the threshold displacement, the second portion of the virtual reality visions is located at a front end of the virtual reality visions along the moving direction.

6. The virtual reality system of claim 1, wherein the threshold displacement is a fixed value.

7. The virtual reality system of claim 1, wherein the motion displacement is detected by a motion sensor disposed on the head-mount display device or a camera sensor disposed on the head-mount display device.

8. The virtual reality system of claim 1, wherein the virtual reality system comprises a base station for generating an optical radiation, the head-mount display device further comprises an optical sensor array, and the motion displacement is detected by the optical sensor array disposed on the head-mount display device.

9. The virtual reality system of claim 1, wherein the virtual reality system comprises a depth camera for capturing the motion displacement of the head-mount display device.

10. The virtual reality system of claim 1, wherein the first scenario and the second scenario are located at different cities, located at different planets, displaying with different color tones or configured in an ancient time and in a modern time.

11. A control method, suitable for a virtual reality system comprising a head-mount display device for displaying virtual reality visions and a virtual reality headset wearable on a user, wherein the head-mount display device is disposed on the virtual reality headset, and when the virtual reality headset is worn on a user, the head-mount display device covers the eyes of the user, the control method comprising:

providing a first virtual reality scene as a whole of the virtual reality visions to be displayed on the head-mount display device;

obtaining a motion displacement of the head-mount display device;

comparing the motion displacement with a threshold displacement;

in response to the motion displacement being shorter than the threshold displacement, providing the first virtual reality scene in a first portion of the virtual reality visions and providing a second virtual reality scene in a second portion of the virtual reality visions according to the motion displacement; and in response to the motion displacement exceeding the threshold displacement, providing the second virtual reality scene as the virtual reality visions to be displayed on the head-mount display device, wherein before comparing the motion displacement with the threshold displacement, the control method further comprises:

obtaining at least one parameter of a user wearing the head-mount display device, the at least one parameter comprising a height, a weight, an age or a gender; and adjusting the threshold displacement according to the at least one parameter;

wherein the first virtual reality scene corresponds to a first scenario and the second virtual reality scene corresponds to a second scenario different from the first scenario, wherein the motion displacement comprises an upward vertical displacement and a downward vertical displacement, and simultaneously an unvarying leftward or rightward rotational displacement, and further simultaneously an unvarying upward or downward tilting displacement, and wherein a change, from providing the first virtual reality scene as the whole of the virtual reality visions into providing the second virtual reality scene in the second portion of the virtual reality visions or as the whole of the virtual reality visions, takes place when a gaze direction of the user while wearing the virtual reality headset is maintained toward a front direction of the user, and the front direction is unvarying in the rotational direction;

wherein before obtaining the motion displacement, the control method further comprises:

displaying a marked area in the first virtual reality scene; and detecting whether a virtual location of the head-mount display device in the first virtual reality scene is located within the marked area or not;

wherein in response to the virtual location being located within the marked area, obtaining the motion displacement of the head-mount display device, and wherein in response to the virtual location being located outside the marked area, ignoring or voiding the motion displacement of the head-mount display device;

wherein the threshold displacement is used for comparison with the motion displacement, comprises a vertical distance, and is free of relation to a leftward or rightward rotational distance and an upward or downward tilting distance.

12. The control method of claim 11, wherein the control method further comprises:

in response to that the motion displacement is shorter than the threshold displacement, continuously adjusting a ratio of the second portion of the virtual reality visions relative to the whole virtual reality visions, the ratio is positively correlated to the motion displacement.

13. The control method of claim 11, wherein in response to that the motion displacement is the upward vertical displacement and the motion displacement is shorter than the threshold displacement, the first portion of the virtual reality visions is located at a lower part of the virtual reality visions, the second portion of the virtual reality visions is located at a higher part of the virtual reality visions.

14. The control method of claim 11, wherein in response to that the motion displacement is the downward vertical displacement and the motion displacement is shorter than the threshold displacement, the first portion of the virtual reality visions is located at a higher part of the virtual reality visions, the second portion of the virtual reality visions is located at a lower part of the virtual reality visions.

15. The control method of claim 11, wherein the motion displacement further comprises a horizontal displacement, in response to that the motion displacement is the horizontal displacement along a moving direction and the motion displacement is shorter than the threshold displacement, the second portion of the virtual reality visions is located at a front end of the virtual reality visions along the moving direction.

16. A non-transitory computer readable storage medium with a computer program to execute a control method, wherein the control method comprises:

providing a first virtual reality scene as a whole of virtual reality visions to be displayed on a head-mount display device;

obtaining a motion displacement of the head-mount display device;

comparing the motion displacement with a threshold displacement;

in response to the motion displacement being shorter than the threshold displacement, providing the first virtual reality scene in a first portion of the virtual reality visions and providing a second virtual reality scene in a second portion of the virtual reality visions according to the motion displacement; and in response to the motion displacement exceeding the threshold displacement, providing the second virtual reality scene as the virtual reality visions to be displayed on the head-mount display device, wherein before comparing the motion displacement with the threshold displacement, the control method further comprises:

obtaining at least one parameter of a user wearing the head-mount display device, the at least one parameter comprising a height, a weight, an age or a gender; and adjusting the threshold displacement according to the at least one parameter;

wherein the first virtual reality scene corresponds to a first scenario and the second virtual reality scene corresponds to a second scenario different from the first scenario, wherein the motion displacement comprises an upward vertical displacement and a downward vertical displacement, and simultaneously an unvarying leftward or rightward rotational displacement, and further simultaneously an unvarying upward or downward tilting displacement, and wherein a change, from providing the first virtual reality scene as the whole of the virtual reality visions into providing the second virtual reality scene in the second portion of the virtual reality visions or as the whole of the virtual reality visions, takes place when a gaze direction of the user while wearing the virtual reality headset is maintained toward a front direction of the user, and the front direction is unvarying in the rotational direction;

wherein before obtaining the motion displacement, the control method further comprises:

displaying a marked area in the first virtual reality scene; and detecting whether a virtual location of the head-mount display device in the first virtual reality scene is located within the marked area or not;

wherein in response to the virtual location being located within the marked area, obtaining the motion displacement of the head-mount display device, and wherein in response to the virtual location being located outside the marked area, ignoring or voiding the motion displacement of the head-mount display device;

wherein the threshold displacement is used for comparison with the motion displacement, comprises a vertical distance, and is free of relation to a leftward or rightward rotational distance and an upward or downward tilting distance.

* * * * *